Jan. 8, 1924.

R. B. WHITMAN 1,480,133

CONTROL MECHANISM

Filed Dec. 12, 1921

Inventor
Ray B. Whitman

Jan. 8, 1924.

R. B. WHITMAN 1,480,133

CONTROL MECHANISM

Filed Dec. 12, 1921

Inventor

Ray B. Whitman

Jan. 8, 1924.
R. B. WHITMAN
1,480,133
CONTROL MECHANISM
Filed Dec. 12, 1921   3 Sheets-Sheet 3
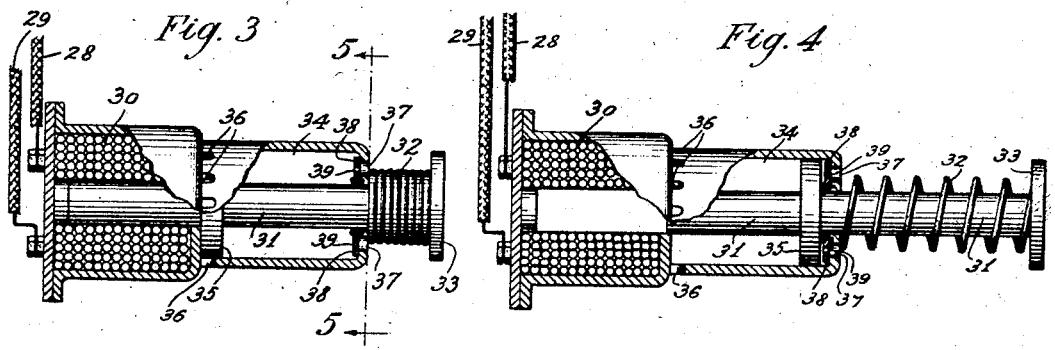
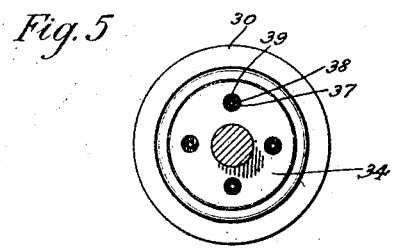
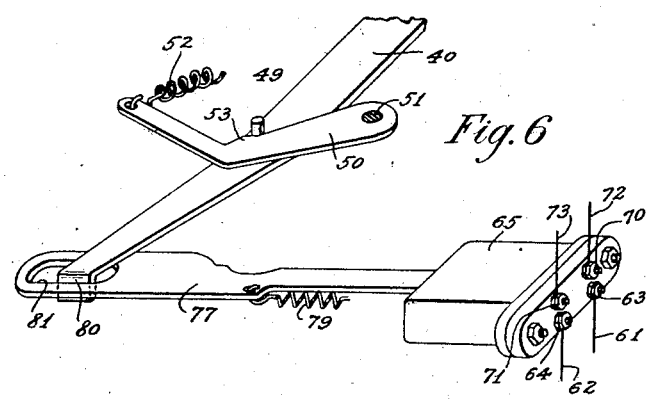
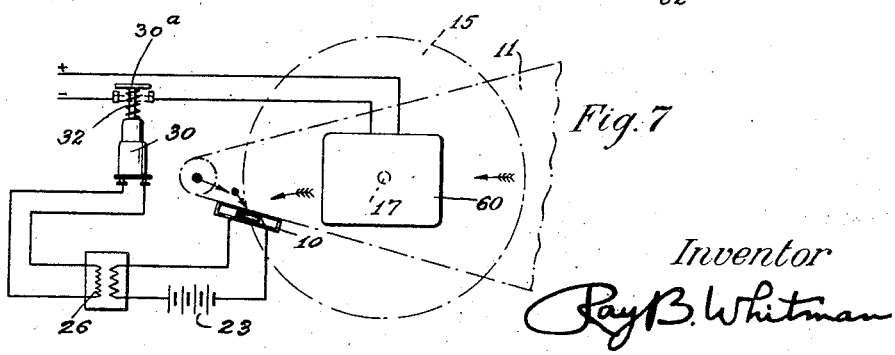
Inventor
Ray B. Whitman Patented Jan. 8, 1924.

1,480,133

UNITED STATES PATENT OFFICE.

RAY B. WHITMAN, OF BRIDGEPORT, CONNECTICUT.

CONTROL MECHANISM.

Application filed December 12, 1921. Serial No. 521,804.

*To all whom it may concern:*

Be it known that I, RAY B. WHITMAN, a citizen of the United States, and a resident of the city of Bridgeport, county of Fairfield, and State of Connecticut, have invented certain new and useful Improvements in Control Mechanism, of which the following, taken in connection with the accompanying drawings, is a specification.

This invention relates to improvements in control mechanism for sound-reproducing machines, and has for its principal object the provision of means by which a phonograph will be stopped automatically, upon permanent cessation of the sound reproduced therein, and irrespective of the length of the sound-record, and also means for starting it manually, or by some variation in the sound produced in the vicinity of the machine.

Heretofore, various mechanical means have been devised for operating stopping mechanism, as, for instance, upon the cessation of the travel of the tone-arm when it reaches the last groove of the record, or the provision of means at the end of the tone-line, adapted to coact with the tone-arm in such a manner as to operate stopping mechanism. But, in all of these devices, the operation of the stopping mechanism depended entirely upon a mechanical cooperation of parts of the playing mechanism, without reference to the actual reproduction of sound; and, furthermore, such devices essentially required the continued operation of the machine for an appreciable period after the actual cessation of the sound reproduction, in order to bring about the cooperation of the mechanical stopping mechanism. This required period, after the reproduction has ceased and before the machine is stopped, is often of such length as to entirely frustrate the purpose of the devices, inasmuch as the annoyance in waiting for the stop to actuate, after the cessation of sound reproduction, practically offsets any advantages over the old method of stopping the machine manually.

The present invention involves a radical and basic departure, in principle, from these previous automatic stopping devices. For it depends not upon any mechanical relation of parts, nor peculiar structure of the sound-record at the end of the record groove, but upon the principle of immediately stopping the machine upon the cessation of the sound reproduction, and as a direct effect of such cessation of sound.

A basic object of the invention is to provide means controlled by a change in sound reproduction—either from normal sound reproduction to partial or complete silence, or vice versa—to effect a mechanical movement or other desired result. This movement may, for instance, be for the purpose of stopping the instrument, altering its speed, starting it, or for repeating the record. It is even conceivable that such movement, so controlled or effected, might be used to move the lid, actuate parts of a multiple-playing phonograph, or any like effects which may be desirable or bear some relation to such sound change.

Another object is to provide auxiliary means for temporarily interrupting or altering any such result so effected,—as, for instance, by providing a lag in the mechanism or other means, so that the latter, while constrained to operate as a result of the sound variance, will be prevented from so doing for a predetermined period.

Another, and most important object, is the provision of basically new and radically-different means for automatically starting a phonograph through the medium of sound. Thus, it is only necessary, with this invention, to merely command the instrument to play, or to effect any other sound or sounds in the vicinity, in order to start the machine playing.

A further and more specific object of the invention, is to provide means, which will operate to automatically stop the machine when the sound reproduction finishes; and which means will be of extreme simplicity; may be conveniently installed upon machines, either as an attachment or built in; and which will be thoroughly efficient in operation.

Another object is to provide automatic starting means, correlated to the automatic stopping means, and adapted to start the machine as the tone-arm is moved from its non-playing position, outside the periphery of the turntable, to or toward the initial playing position.

Yet another object is to provide means by which the device will be rendered inoperative to stop the machine before a predetermined traverse of the tone-arm over the record, and while the tone-arm remains within certain limits, relatively to the initial playing position, so that there will be no possibility of the machine stopping while the needle is being placed in position for playing, and at which time, of course, there is no production of sound.

With these and other objects in view, embodiments of the invention are shown in the accompanying drawings, and these embodiments will be hereinafter more fully described with reference thereto, and the invention then pointed out in claims.

In the drawings—

Fig. 3 is a detailed view, partially in section, and partially in elevation, of the electro-magnetic, stop-actuating means employed, and showing its various parts in the position when the stop is inoperative and the machine is running;

Fig. 4 is a similar view, but showing the actuated position of the parts when the stop is rendered operative;

Fig. 5 is a sectional view, taken along line 5—5 of Fig. 3;

Fig. 6 is a perspective view of the electric switch, and its control mechanism, employed in connection with the electric motor-driven embodiment shown in Fig. 2; and Fig. 7 is a diagrammatic view of a simplified form of starting and stopping means, in combination, as hereinafter described.

Similar reference characters indicate corresponding parts throughout the several figures of the drawings.

Figure 1:
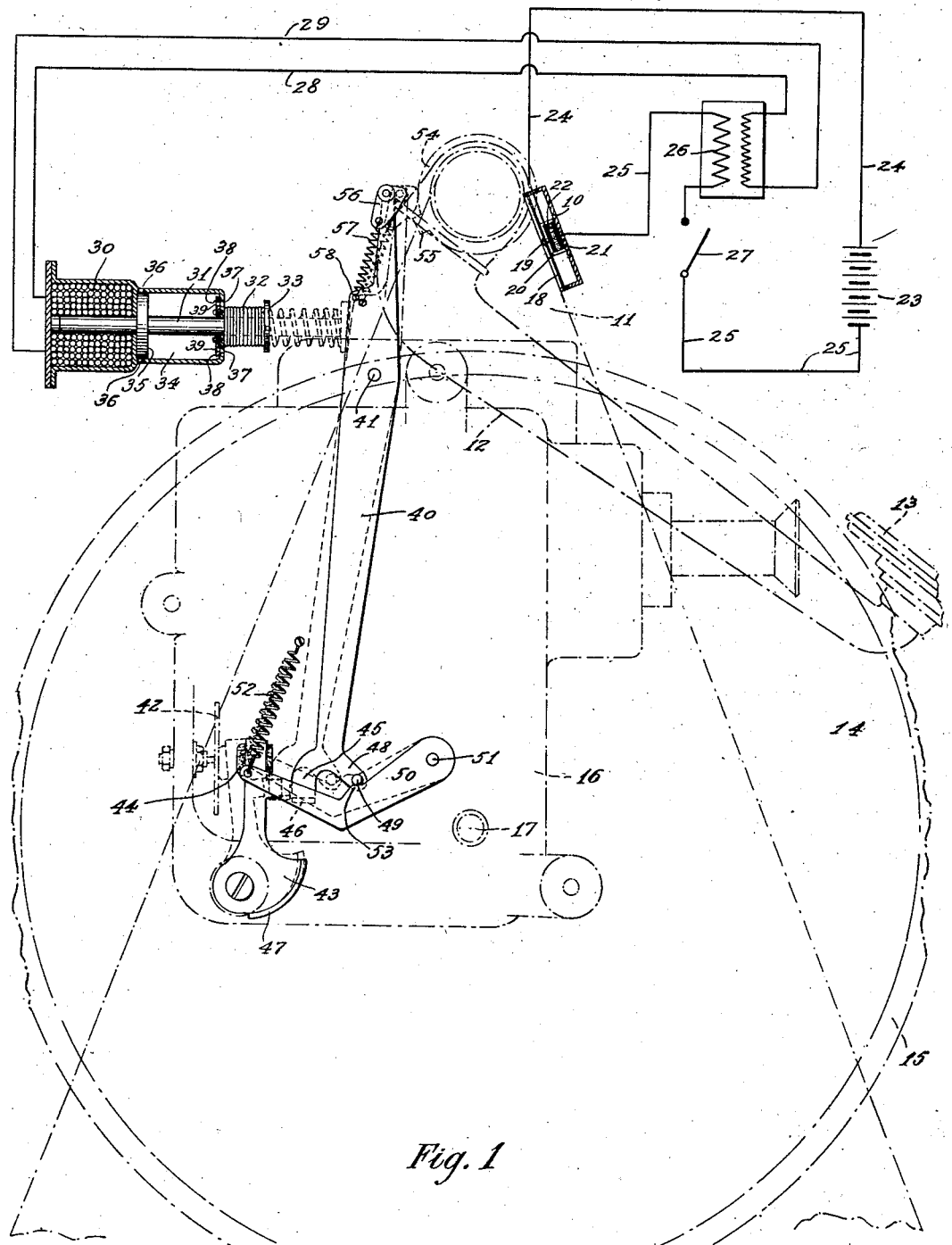
Fig. 1 is a diagrammatic plan view of a spring-actuated phonographic apparatus, embodying my invention; the several parts of the phonograph proper are shown in dot-and-dash lines, thus accentuating by comparison the invention itself.

The invention comprises, essentially, a means sensitive to sound waves, and adapted to be so controlled thereby that either through their generation, continuation, or cessation, certain desired work will be performed, particularly as regards the present embodiments, with relation to the operation of a phonograph. This work consists, as shown in these embodiments, in causing the stoppage of the machine upon cessation of sound, and the starting by the generation of sound, and in one embodiment, the combination of the sound-controlled stopping means with manually operable starting means. The basic principle of the invention, however, may be utilized to perform many other functions than those enumerated, so that the invention is not to be considered as limited to use with phonographs, or for performing the particular operations illustrated.

In the present embodiment of the invention, the sound-sensitive member takes the form of a microphone 10 (Fig. 1), disposed at a point in the sound-conduit or horn 11, at which it will not interfere with the sound waves passing therethrough, but, at the same time, will be positively actuated thereby. The sound-conduit communicates in the usual manner with the tone-arm 12, at the end of which there is provided a sound-box 13, cooperating with the record 14, mounted on a turn-table 15, and driven from the spring motor 16, through the turn-table shaft 17.

The microphone may be of any construction capable of carrying out the purposes of the invention. For instance, it may consist, as shown, of a flanged casing provided with a diaphragm 18, so disposed as to form a part of the surface of the horn wall, and connected at a center point, as at 19, to a carbon disc 20, forming a vibratory electrode. A fixed carbon disc 21, forming a stationary electrode, is secured to the casing, and granulated carbon particles 22 are disposed between the two electrodes.

The electrodes are respectively connected to a source of current supply 23 by conducting-wires 24 and 25, the wire 25 being connected to the low potential coil of a step-up transformer 26. A switch 27 is also connected in the circuit for shutting off the supply of current when the machine is not being operated, this being desirable, though not, of course, essential.

The high potential coil of the transformer is connected by wires 28 and 29 to a solenoid 30, having a plunger 31 adapted to be drawn first in one direction, or into the solenoid, upon energization of the solenoid, and then in the opposite direction under the force of a spring 32 interposed between the head 33 of the plunger and the outer end of a chambered, cylindrical extension 34. A piston 35, mounted on the plunger, is slidable in the cylindrical extension, and forms therewith a dash-pot adapted to restrain and delay the action of the plunger, as it moves under the force of the spring 32.

The normal current, passing through the circuit with the microphone in a non-vibratory state, — i. e., when no sounds are being transmitted through the horn— is made insufficient to energize the solenoid to an adequate strength to retract the plunger, against the force of the spring 32. For in an unvibratory state, the carbon particles are in such loose contact with each other, that sufficient resistance is set up to prevent any appreciable part of the current from passing. During the playing of a record, however, the sound waves act upon the microphone and cause the carbon particles 22 to be agitated and compressed, so that the current transmitted is increased proportionately; and this current, when its amperage has been increased by the action of the transformer, has sufficient magnetic power to energize the solenoid to move the plunger to its retracted position; this position is shown in full lines on the drawing. The plunger is maintained in this position as long as the reproduction of sound is continued. It will be understood that the movement of the plunger to the stopping position, indicated in dotted lines, may be utilized, to actuate many other forms of stop devices, such, for instance, as detent- or trip-actuated brakes, electric switches, etc. Also, such movement might be used to raise the lid, return the tone-arm, and so on. Any such means, is, therefore, contemplated by this embodiment of the basic invention.

Air outlets 36 are provided in the cylindrical extension 34, adjacent its base (Figs. 3 and 4); and other air outlets 37 are provided at its end (Fig. 5), these latter openings being controlled by flap valves 38 having small bleed-holes 39 therein. The action of this construction is to permit of the free inward movement of the plunger when it is actuated by the solenoid; for the air at one side of the piston 35 is forced out through the holes 36, and air is admitted behind the piston through the holes 37, the flap valves being open so that no suction is created behind the piston. As the holes 36 and 37 are relatively large, practically no restraining effect is produced upon the piston during this movement. As the plunger moves in the other direction, however, under the force of the spring 32, it is restrained in its movement by closure of the flap valves, a restricted and controllable amount of air escaping through the bleed-holes thereof, which permits of the slow movement of the plunger. The purpose of this construction is to prevent the actuation of the plunger under the force of the spring, to stop the machine, if it should so happen that the particular music being reproduced should have a silent or rest period, when, of course, the production of sound waves would cease and the solenoid would release the plunger. In no case, however, with this dash-pot arrangement shown, would the rest period be sufficient to permit of the complete movement of the plunger, so retarded; and upon resumption of the production of sound, the solenoid would be re-energized sufficiently to retract the plunger back to the position shown in Fig. 3.

In the present form, there is provided in cooperative relation with the plunger a start and stop lever 40, pivotally mounted upon the motor-frame at 41, and having its short arm extending into relation with the tone-arm base, and also with the head of the solenoid-actuated plunger 31, and a long arm extending in relation to the governor disc 42 of the motor, and adapted to cooperate with the governor disc through the intermediary of a pivoted brake lever 43, provided with a brake pad 44, which engages the governor disc.

The end of the lever 40 is provided with an offset projection 45, having a lug 46 provided at its end, and adapted to engage the brake lever 43, as shown, and move it into stopping relation with the governor disc, as the lever 40 is moved to that one of its two positions, which is shown by the dotted lines (Fig. 1). The other position of the lever 40 permits movement of the brake lever from braking position to governing position. In this latter position, shown in full line, the brake pad acts as a friction pad, since the disc 42 moves into engagement with it as the speed increases. The regulation of speed depends upon the position of the brake lever, which may be determined by suitable adjustable means (not shown), cooperating with the eccentric flange 47 formed thereon, to limit its movement.

A finger projection 48 (Fig. 1), at the end of the lever 40, is provided with a pin 49 engaging an angular retaining lever 50, pivoted at 51, and having a spring 52' secured at its end which maintains it yieldably in engagement with the pin 49. A pointed projection 53, having inclines at each side of its apex, is provided upon the lever, and provides angular seats at each side of the projection, in which the pin 49 is yieldably held in either of the two positions of the lever 40.

As before pointed out, the movement of the tone-arm inwardly across the record, moves the lever 40 to starting position (i. e. full lines Fig. 1), while movement of the plunger 31, to the position shown in dotted lines, through the action of the spring 32, moves it to stopping position (shown dotted).

The particular starting means, associated with the stop, comprises a ring 54 secured to the vertical, tubular portion of the tone-arm, and provided with a projection 55, adapted to cooperate with a pivoted shoe 56 provided at the end of the short arm of the lever 40. This shoe is substantially triangular shaped, being pivoted at one corner, and yieldably held in normal position by a spring 57 between another corner and a projecting portion 58 of the lever 40.

The dotted lines indicate the stopping position of the lever 40 and the non-playing position of the tone-arm outside the periphery of the turn-table. As the tone-arm is moved inwardly to the first tone-line of the record, the projection 55 engages the shoe 56 and forces the lever 40 to its starting or playing position, this resulting from the fact that the surface of the shoe, engaged by the projection, is substantially at right angles to a line passing through the center of the pivot and the point of contact, so that the action of the projection is to produce a direct propelling force upon the lever 40 without any tendency to rotate the shoe. While the projection 55 remains in engagement with the shoe, and which corresponds to the movement of the stylus with its soundbox over an annular playing area (on a ten-inch record, for instance) of about one inch, the lever is locked against movement to its stopping position. This may be called a "safety zone"; it enables the tone-arm to be moved to playing position without the possibility of the stop-mechanism operating, in the event there is any hesitation on the part of the operator in placing the stylus upon the record,—for this, of course, and in the absence of such a safety zone, would cause the stop mechanism to actuate.

As before explained, the reproduction of the sound vibrates the diaphragm 18 positioned in the sound outlet, in such manner as to cause the microphone to so function that a sufficient current is produced in the solenoid to enable it to draw the plunger out of engagement with the lever 40, to the position as shown in full lines; and upon cessation of the sound waves, the intermittent contact being entirely broken, the current diminishes to a point where the solenoid has not sufficient magnetic strength to further offset the action of the spring 32, which then forces the plunger out, and it thereupon engages and moves lever 40 to stopping position. The tone-arm, which is now at the inner tone-line of the record, may be manually moved again to its non-playing position, outside the periphery of the turn-table, and during this movement, the projection 55, in passing the shoe 56, will merely rotate it about its pivot without imparting movement to the lever 40.

Figure 2:
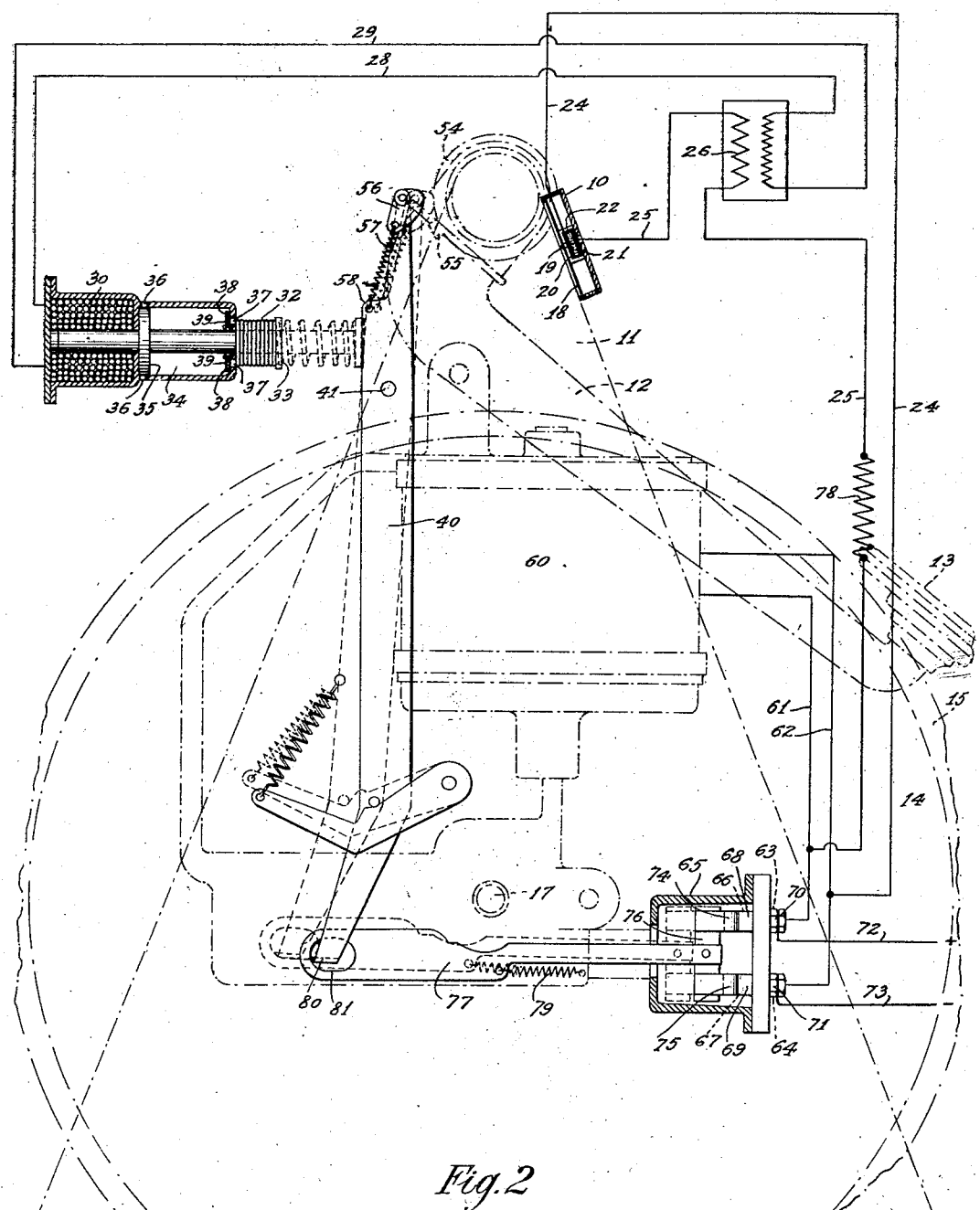
Fig. 2 is a similar view, but showing the invention as applied to an electrically-actuated phonographic apparatus.

In Fig. 2, the invention is illustrated as applied to an electric motor unit. The electric motor 60 is supplied with current through conductor wires 61 and 62, which connect to the two lower binding posts 63 and 64 (Fig. 6) of a switch 65. The terminals 66 and 67 (Fig. 2) of the binding posts 63 and 64 are spaced from terminals 68 and 69 of upper binding posts 70 and 71, to which conductor wires 72 and 73 from a source of current supply are connected. The spaced terminals 66 and 68, and 67 and 69 are adapted to be connected to close the circuit by spanners 74 and 75 mounted upon an insulating block 76, to which is pivotally connected a reciprocating bar 77. The conductor wires 24 and 25 of the microphone are connected in parallel in the circuit of the conductor wires 61 and 62 of the motor, and suitable resistance 78 may be provided in the microphone circuit, as indicated, to regulate the current thereto.

A spring 79, connected to the reciprocating bar 77, is adapted to maintain the spanners 74 and 75 in contact with the terminals, as shown in full lines, and in which position the start and stop lever 40 is in the starting position. The start and stop lever in this form differs only from the other form to the extent of re-designing the end of the long arm, to connect with the reciprocating bar 77, being provided for this purpose with a downwardly bent lug 80 engaging an opening 81 in the end of the said bar. When the stop mechanism is actuated through the cessation of sound, the lever 40 is moved to the dotted line position, thereby reciprocating the bar 77 to the left (as shown), and removing the spanners from engagement with the terminals, thus breaking the circuit and stopping the motor. This movement might also be utilized to simultaneously apply a brake to the motor or connected bar, to accelerate this stopping by overcoming the momentum of the moving parts, although this will ordinarily not be necessary.

In Fig. 7, an embodiment of the invention is shown, in which the phonograph is both started and stopped through the effect of sound waves, the starting occurring as the result of the generation of sound,—as by speaking in the vicinity of the machine—and stopped through cessation of the sound produced by the machine. The construction comprises, in combination with the electric motor 60, the horn 11, a record 15, the microphone 10, similar to that disclosed in the other embodiments, with its battery 23, transformer 26 and solenoid 30. The solenoid is arranged to operate a switch 30ª to make and break the circuit in the current supply line of the motor 60, the spring 32 of the plunger normally holding the switch open. In order to start the machine, it is only necessary to pass sound through the horn, so that it impinges upon the diaphragm of the microphone. Such sound will preferably be produced by speaking, or otherwise producing a sound in the vicinity of the horn, and is indicated in the drawings by the arrows directed inwardly through the horn. The immediate effect of this is to set up such vibrations in the microphone as to cause current to be passed through the circuit to the transformer, where its potential is increased, and passes to the solenoid which, being energized, draws the plunger inwardly and closes the circuit of the motor, thereby starting the machine. The sound then produced by the machine, and issuing outwardly through the horn, impinges on the microphone diaphragm, thereby maintaining the switch closed as long as the sound production continues. Upon the cessation of sound, the current in the solenoid circuit is diminished so as to release the plunger, which, after a period sufficient to overcome the restraining action upon the plunger, caused by the dash-pot mechanism, (as described more fully in connection with the other embodiments), opens the switch and thereby stops the motor.

Fundamentally, therefore, the invention consists in effecting or controlling, through the effect of sound waves, either by their generation, continuation or cessation, any desired mechanical or other movement or result. It is employed to particular advantage in connection with phonograph mechanisms, permitting the stopping of the machine at the end of the sound reproduction—the only logical time to effect such stopping—and entirely automatically, and without presetting. The machine may be started manually, or according to one embodiment it may be started merely by producing sound in its vicinity, as by speaking—literally commanding it to start.

The principle is applicable to starting, stopping, braking, supplying, or cutting off power, or performing other desired movements or results, either entirely through the effect of sound, or in combination with other automatic or mechanical operations—as, for instance, starting manually and stopping through the sound effect—or vice versa.

While the drawings show, diagrammatically, a device operating on the microphone principle, acting in conjunction with a solenoid structure, and having a resistance and transformer in circuit, it is, of course, understood that any other means capable of producing or controlling energy, through the action of sound waves thereon, is contemplated. Therefore, it is understood that, while there are illustrated particular embodiments, other changes found desirable for carrying out the invention are within the spirit and scope thereof, as defined in the appended claims.

Having now described the invention, what is claimed as new, and for which Letters Patent is desired, is:

1. In a sound-producing means, a mechanism, sound-sensitive means, and stopping means for the mechanism adapted to be rendered inoperative by the sound-sensitive means during the production of sound, and adapted to be made operative through the cessation of sound.

2. In a sound-producing means, a mechanism, sound-sensitive means, and stopping means for the mechanism adapted to be rendered inoperative by the sound sensitive means during the production of sound, and adapted to be made operative through a predetermined decrease of sound.

3. In a sound-producing device, a driving mechanism, stopping means therefor, and sound-sensitive means adapted to actuate the stopping means through the cessation of sound.

4. In a sound-producing device, a driving mechanism, starting means therefor, stopping means therefor, and sound-sensitive means adapted to actuate the stopping means through the cessation of sound.

5. In a second-producing device, a driving mechanism, starting means therefor adapted to be automatically actuated upon placing the device in starting position, stopping means, and sound-sensitive means adapted to actuate the stopping means through the cessation of sound.

6. In a phonograph, a sound-record support and a sound-box, driving mechanism therefor, starting means therefor adapted to be operated upon placing the sound-box in initial playing position, and stopping means adapted to be actuated through cessation of the sound reproduction.

7. In a phonograph, a sound-record support and a sound-box, driving mechanism therefor, stopping means therefor adapted to be actuated through cessation of the sound reproduction, and means rendering the stop mechanism inoperative during a predetermined initial playing period.

8. In a phonograph, a sound-record support and a sound-box, driving mechanism therefor, stopping means therefor adapted to be actuated through cessation of the sound reproduction, and means rendering the stop mechanism inoperative during a predetermined initial traverse of the sound-box.

9. In a phonograph, a sound-record support and a sound-box, driving mechanism therefor, stopping means therefor adapted to be actuated through cessation of the sound reproduction, and means rendering the stop mechanism inoperative for predetermined periods of sound-cessation.

10. In a phonograph, a sound-record support and a sound-box, driving mechanism therefor, stopping means therefor adapted to be actuated through cessation of the sound reproduction, and means adapted to restrain the operation of the stop mechanism for predetermined periods of sound-cessation.

11. In a phonograph, a sound-record support and a sound-box, driving mechanism therefor, stopping means therefor adapted to be actuated through cessation of the sound reproduction, and means having a predetermined restraining action upon the stopping mechanism and adapted to prevent the operation of the stopping mechanism during normal periods of rest occurring during the sound reproduction.

12. In a phonograph, a sound-record support and a sound-box, driving mechanism therefor, starting means therefor adapted to be operated upon placing the sound-record in initial playing position, stopping means therefor adapted to be actuated through cessation of the sound reproduction, said starting means being adapted to render the stop mechanism inoperative during a predetermined initial playing period.

13. In a phonograph, a movable record support, means for driving said support, stopping means for said movable record support, and means associated with the stopping means and adapted to actuate said stopping means through the cessation of sound.

14. In combination with phonic mechanism, a record support, starting means and stopping means therefor, and actuating means for the stopping means adapted to be controlled through the production and cessation of sound waves.

15. In combination with a phonographic machine, means for effecting or controlling movement, means adapted to actuate said first-named means through the medium of sound variation, and means for controllably delaying said movement after said sound variation.

16. In combination, a rotative element, means for effecting or controlling the movement of said element, and other means associated therewith and adapted to actuate said first-named means through the production or cessation of sound.

17. In combination, a rotative element, automatic stopping means therefor, and means associated with said last-named means and adapted to be actuated through the variation of sound.

18. In combination, a rotative element, automatic starting means therefor, and means associated with said last-named means and adapted to be actuated through the variation of sound.

19. In combination with a phonographic mechanism, a movable record support, automatic starting means therefor, and means associated with said means and adapted to function with an increase of sound.

20. In combination, a rotative element, automatic starting means therefor, automatic stopping means therefor, and means associated with said starting and stopping means and adapted to be actuated through the variation of sound.

21. In combination, with a phonic apparatus, record-rotating means, automatic braking means therefor, and means associated with said last-named means and adapted to be actuated through the variation of sound.

22. In a sound-producing mechanism, a spring-driven-motor, a brake therefor, and sound-sensitive means adapted to operate the brake to stopping position upon cessation of sound.

23. In a sound-producing mechanism, driving means, a stop lever adapted to be actuated to cause the stopping of the driving means, and sound-sensitive means adapted to actuate said stop lever to stopping position upon cessation of sound.

24. In a sound-producing mechanism, a sound-record support, a sound-box, a start and stop lever adapted to be moved to starting position upon movement of the sound-box to initial playing position, and sound-sensitive means adapted to actuate the lever to stopping position upon cessation of sound.

25. In a sound-producing mechanism, a microphone, and stopping means for the mechanism adapted to be rendered inoperative by the microphone during the production of sound, and adapted to be made operative through the cessation of sound.

26. In a sound-producing mechanism, sound-sensitive means, and stopping means for the mechanism including a solenoid adapted to be rendered inoperative to stop the mechanism by the sound-sensitive means during the production of sound, and adapted to be made operative through the cessation of sound.

27. In a sound-producing mechanism, sound-sensitive means, and stopping means for the mechanism including a solenoid adapted to be rendered inoperative to stop the mechanism by the sound-sensitive means during the production of sound, and adapted to be made operative through the cessation of sound, and restraining means adapted to restrain the actuation of the solenoid to stopping position for a predetermined position.

28. In a sound-producing mechanism, a microphone, and stopping means for the mechanism including a solenoid adapted to be rendered inoperative to stop the mechanism by the microphone during the production of sound, and adapted to be made operative through the cessation of sound.

29. In combination, movement control means, and other means associated therewith and adapted to render functionally operable said first-named means through the continuation of sound waves.

30. In combination, movement control means, and other means associated therewith and adapted to render functionally operable said first-named means through the cessation of sound-waves.

Signed at Bridgeport, in the county of Fairfield, and State of Connecticut, this 9th day of December, A. D. 1921.

RAY B. WHITMAN.